United States Patent [19]

Fielding et al.

[11] Patent Number: 5,408,555
[45] Date of Patent: Apr. 18, 1995

[54] POLARIZATION INSENSITIVE WAVELENGTH MULTIPLEXING 2×2 FIBRE COUPLERS

[75] Inventors: Alan Fielding; Christopher Chew, both of Bishop's Stortford; Vernon Baker, Harlow; Sandra Davis, Ware, all of United Kingdom

[73] Assignee: Northern Telecom Limited, Montreal, Canada

[21] Appl. No.: 223,444

[22] Filed: Apr. 5, 1994

[30] Foreign Application Priority Data

May 19, 1993 [GB] United Kingdom ................ 9310260

[51] Int. Cl.$^6$ .................................................. G02B 6/26
[52] U.S. Cl. ............................................ 385/43; 385/15; 385/11; 385/48; 385/96; 65/501; 65/438
[58] Field of Search ................ 385/43, 11, 48, 50, 385/51, 52, 42, 15, 96; 65/4.2, 4.3, 31, 501, 500, 438, 435

[56] References Cited

U.S. PATENT DOCUMENTS

| Re. 33,296 | 8/1990 | Stowe et al. | 385/51 |
|---|---|---|---|
| 4,591,372 | 5/1986 | Bricheno et al. | 385/50 X |
| 4,612,028 | 9/1986 | Abebe et al. | 65/4.2 |
| 4,801,185 | 1/1989 | Bricheno | 385/42 |

FOREIGN PATENT DOCUMENTS

2150703  7/1985  United Kingdom ............... 385/50

OTHER PUBLICATIONS

Wilkinson, "Close-Spaced Fused Fibre Wavelength Division Multiplexers With Very Low Polarisation Sensitivity", Electronics Letters, vol. 26, No. 6, pp. 382-384, Mar. 15, 1990.

Boucouvalas, "Methods For Fine-Tuning The Wavelength Response of Single-Mode Optical-Fibre Taper Filters," Electronics Letters, vol. 23, No. 8, pp. 410-411, Apr. 9, 1987.

Wilkinson, "Control of Polarisation Degradation in Fibre Amplifier WDMS", Electronic Letters, vol. 29, No. 2, pp. 214-215, Jan 21, 1993.

Birks, "Twist-Induced Tuning In Tapered Fibre Couplers", Applied Optics, vol. 28, No. 19, pp. 4226-4233, Oct. 1, 1989.

O'Sullivan, "Control of Polarisation Degradation in Fibre Amplifier WDMS", Electronics Letters, vol. 28, No. 17, pp. 1616-1618, Aug. 13, 1992.

*Primary Examiner*—Frank Gonzalez
*Assistant Examiner*—Phan Thi Heartney
*Attorney, Agent, or Firm*—Lee, Mann, Smith, McWilliams, Sweeney & Ohlson

[57] ABSTRACT

In the manufacture of a wavelength multiplexing 2×2 tapered fused fiber coupler by progressive stretching, the birefringence of the coupler resulting from the progressive stretching is subsequently nulled-out by elastic twisting of the coupler. The progressive stretching is performed, under temperature conditions providing a profile in the coupling region of the coupler having the property that the coupling strength for one of the principal polarization planes of the coupler remains substantially constant during said elastic twisting.

3 Claims, 6 Drawing Sheets

POLARIZATION INSENSITIVE WAVELENGTH MULTIPLEXING 2×2 FIBRE COUPLERS

BACKGROUND OF THE INVENTION

This invention relates to the provision of polarisation state insensitive wavelength multiplexing 2×2 tapered fused fibre couplers.

It is known that mutual coupling between a pair of identical optical fibres can be achieved by arranging them in side-by-side contact, heating them to produce adhesion, and then stretching them, while hot, to produce localised plastic flow in order to provide a region of reduced cross-section where the evanescent fields of the two fibres are enlarged by an amount providing substantial overlap of those evanscent fields. This overlapping of the evanscent fields produces a mutual coupling of the two fibres, and thus there is produced a 2×2 tapered fused fibre coupler. The strength of the coupling depends upon the amount of overlap, which is both mode dependent and wavelength dependent, and depends also upon the length and shape of the coupling region. If the two fibres are single mode fibres, the stretching may be controlled to produce a wavelength multiplexing 2×2 tapered fused fibre coupler having, in principle, the property that light of one specified wavelength, hereinafter referred to as the minimum power transfer wavelength, launched into one end of one of the fibres will emerge substantially exclusively from the other end of that same fibre, while light of another specified wavelength, hereinafter referred to as the maximum power transfer wavelength, launched into the same one end of the same one of the fibres will emerge substantially exclusively from the other end of the other fibre. In practice, because the coupling region of reduced cross-section does not possess circular symmetry, the coupling coefficient for light of any given wavelength that is plane polarised in the plane that contains the axes of the two fibre cores is not exactly the same as that for the same wavelength plane polarised in the perpendicular plane. In practice therefore the coupler exhibits birefringence whose priciple planes are those two planes respectively in, and perpendicular to, the plane that contains the axes of the two fibre cores, and in consequence there are different minimum and maximum power transfer wavelengths for each of the two principle planes.

A particular convenient way of making 2×2 tapered fused fibre couplers in a manner readily capable of producing regularly reproducible results is the progressive stretching method described in GB 2 150 703 B. This progressive stretching method uses a pair of clamps mounted on independent linear motion drives designed to move in the axial direction defined by the line joining the two clamps. A stranded pair of fibres is secured to extend in the axial direction between the two clamps, and beneath the fibres is located a burned to provide a localised hot zone. With the burner lit to heat the fibres to a temperature at which the viscosity is reduced just enough to allow plastic deformation under tension, the two clamps are caused to move at controlled rates in the same direction. The leading clamp is caused to move a controlled amount faster than the trailing clamp so as to cause plastic stretching of the fibre at a controlled rate. In this way a stretched region of slightly reduced cross-section is produced that terminates at each end in a small taper up to the full-size, unstretched, regions of stranded fibre. The proportional reduction in cross-section, the draw-down ratio, produced by a single traversal is determined by the speeds of the two drives. The length of the reduced cross-section region can be varied independently of the draw-down ratio by varying the duration of the traversal. Typically between five and ten traversals may be employed to effect something in the region of a forty to fifty-fold reduction in cross-sectional area. Conveniently successive traverses may be performed in alternate directions, with the leading drive of one traverse becoming the trailing drive of the next traverse. It is also generally desirable to make each successive traverse slightly shorter than the immediately preceding traverse so that a relatively smooth adiabatic taper is produced at each end of the reduced cross-section region from that size right up to the cross-section of the full-size unstretched regions.

By launching light into one end of one of the two stranded fibres, and looking at what proportion emerges from its far end in relation to that which emerges from the far end of the other fibre, the amount of coupling provided by the progressive stretching can be continuously monitored as the stretching proceeds. GB 2 150 703 B explains that an advantage of using a very small width burner is that only a small proportion of the total length of the reduced cross-section length is heated at any one time, and hence the overall coupling strength changes relatively little when the burner is turned off and the refractive index of the heated portion changes due to thermal effects. This is clearly advantageous if one wants to perform the whole progressive stretching operation in one continuous interrupted burn. If, on the other hand, one is content to approach close to the end point, and then proceed in a series of short duration bursts of the burner (synchronised with bursts of progressive stretching), then one can readily monitor the 'cold' coupling strength between successive bursts, in which case it may be advantageous to use a burner of more extended width.

Another significant controllable variable of the progressive stretching method is the heat of the burner. If the burner provides a relatively low softening temperature, the two fibres do not coalesce to any great extent in the reduced cross-section couplng region, which in consequence has a cross-section approximating to a figure-of-eight. On the other hand, if the burner provides a significantly higher temperature, then surface tension effects are more pronounced, the re-entrants of the figure-of-eight are eliminated, and the cross-section approaches a more nearly round profile that exhibits reduced birefringence in comparison with the figure-of-eight profile.

A paper by I. J. Wilkinson and C. J. Rowe entitled 'Close-Spaced Fused Fibre Wavelength Division Multiplexers with Very Low Polarisation Sensitivity' Electronics Letters Volume 26 pp 382–4 (1990) describes how the polarisation sensitivity (birefringence) of a wavelength multiplexing fused fibre 2×2 coupler can be substantially nulled-out by elastically twisting the coupler after its fabrication. For practical utility it is important to know what effect this twisting has upon the spectral positioning of the minimum and maximum power transfer wavelengths of the two principal polarisation planes of the coupler that were defined prior to the elastic twisting. Prior to this twisting, the coupler had minimum and maximum power transfer wavelengths for one of the principal planes of polarisation that may be respectively labelled as $\lambda_1$ and $\lambda_2$. Similarly, for the other principal polarisation plane, the corresponding minimum and maximum power transfer wavelengths may be respectively labelled $\lambda_3$ and $\lambda_4$. Prior to the twisting the multiplexer is, by definition, birefringent, and hence either $\lambda_1 \neq \lambda_3$, or $\lambda_2 \neq \lambda_4$, or both $\lambda_1 \neq \lambda_3$ and $\lambda_2 \neq \lambda_4$. The elastic twisting serves to null-out the birefringence, and hence, after the twisting, the coupler exhibits the same minimum power transfer wavelength for all input states of polarisation (SOP's) which may be labelled $\lambda_5$, and also, for any input SOP, corresponding maximum power transfer wavelength, which may be labelled $\lambda_6$.

Wilkinson and Rowe assert that the channel spacing and passband positions 'are unaffected by the twisting, and in a later paper entitled 'Control of Polarisation Degradation in Fibre Amplifier WDM's' Electronic Letters Volume 29 No. 2 pp 214–5 (1993), Wilkinson specifically asserts that 'twisting has no effect whatever on channel spacing or the wavelengths of maximum or minimum splitting'. These assertions can be alternatively stated as $\lambda_1 = \lambda_3 = \lambda_5$ and $\lambda_2 = \lambda_4 = \lambda_{6''}$ but this equality relationship is inconsistent with the inequality relationship developed above. It is clear therefore that, whatever Wilkinson and Rowe may say to the contrary, it is axiomatic that, if twisting removes polarisation sensitivity, this must inevitably involve some changes in at least some of the wavelengths of maximum and minimum power transfer between the fibres. In the particular instance described in the Wilkinson and Rowe paper, the upper wavelength end of the experimental trace of FIG. 3a passes through a final maximum at a first wavelength before ending in a minimum at a second, somewhat greater, wavelength. These two wavelengths are the maximum and the minimum power transfer wavelengths for some unspecified SOP applied to the coupler before it has been twisted, and hence while it still retains its polarisation sensitivity (birefringence). FIG. 3b shows that, after twisting, the rôles of these two wavelengths have been interchanged, with the wavelength that was previously the maximum power transfer wavelength, now becoming the minimum power transfer wavelength, while the wavelength, that was previously the minimum power transfer wavelength now becoming the maximum power transfer wavelength. This interchange is specifically confirmed by the later Wilkinson paper, which specifically acknowledges that 'the maxima and minima swap output ports'. This swapping of the rôles of the output ports means that, far from staying stationary as suggested by Wilkinson and Rowe, their example demonstrates a change in coupling strength produced by the twisting that serves to produce a wavelength shift equal in magnitude to the full wavelength separation of the two channels of their multiplexer.

Such wavelength shift produced by twisting is described by T. A. Birks in a paper entitled, 'Twist-Induced Tuning in Tapered Fiber Couplers', Applied Optics Volume 28 pp 4226–33 (1989), who employs the effect for achieving wavelength tuning. The effect is also referred to in a paper by N. M. O'Sullivan T. A. Birks and C. D. Hussey in a paper entitled, 'Control of Polarisation Degradation in Fibre Amplifier WDMs', Electronics Letters Volume 28 pp 1616–8, and again by these three authors in a later 'Reply', Electronics Letters Volume 29 pp 215, to the previously referenced later Wilkinson paper. In that reply the three authors state that they have found that twist tuning can increase the channel wavelengths of 1480/1550 nm WDM's by up to 30 nm.

For many applications the precise spectral position of the minimum and maximum power transfer wavelengths of a wavelength multiplexing coupler is of critical importance. Sometimes the positioning of one is of greater importance than that of the other. For instance, in the case of a multiplexing coupler employed in an optically pumped amplifier, the registration of one of the power transfer wavelengths with the wavelength of the optical pump power may be of less importance than the registration of the other power transfer wavelength with the wavelength of the signal to be amplified. This can be because the optical pump power source is readily tuneable, or because wastage of pump power through mis-registry is of less consequence than wastage of signal power.

During the manufacture of a polarisation sensitive 2×2 fused fibre wavelength multiplexing coupler, the progress of the manufacture can be continuously monitored in a way that enables termination at a particular moment providing a relatively high level of precision in the spectral positioning of the minimum and maximum power transfer wavelengths for one of the principal planes of polarisation of the coupler, but if subsequent elastic twisting is going to produce a significant wavelength shift, the spectral positioning of the corresponding power transfer wavelengths of the polarisation sensitive nulled coupler may be incapable of being foretold with anywhere near comparable precision because of an inability to foretell with certainty the precise magnitude of that shift.

SUMMARY OF THE INVENTION

The present invention is directed to a method of making a polarisation insentive 2×2 tapered fused fibre wavelength multiplexing coupler by a two stage process, the first stage of which involves making a coupler which is birefringent, and hence does exhibit polarisation sensitivity, but which also possesses a special property. This property is that the minimum and maximum power transfer wavelengths for a particular one of the principal polarisation planes defined by the birefringence of the coupler remains substantially unchanged under the operation of performing the second stage, which comprises elastically twisting the birefringent coupler so as substantially to null out its polarisation sensitivity.

According to the present invention there is provided a method of manufacturing a wavelength multiplexing 2×2 tapered fused fibre coupler by progressive stretching, wherein birefringence in the coupler resulting from coupling produced by the progressive stretching to produce a coupling region is substantially nulled-out by elastic twisting of the progressively stretched coupling region, and wherein the progressive stretching is performed under temperature conditions providing the coupling region with a profile having the property that the coupling for one of the principle birefringence planes of polarisation of the coupling region remains substantially constant during said elastic twisting, The invention also provides a method of making a 2×2 tapered fused fibre wavelength multiplexing coupler for multiplexing first and second wavelengths, wherein a pair of single mode optical fibres arranged in side-by-side contact are heated in a zone where they are in contact, fused together and plastically stretched in a manner providing two tapers with an intervening region of reduced, substantially constant, cross-section, along which intervening region the two fibres are mutually optically coupled, wherein the intervening region is elastically twisted substantially to null, at each of said first and second wavelengths, the difference between the coupling coefficients of the two principal states of polarisation (SOP's) defined by the coupler, and wherein the fusion of the two fibres is at a temperature providing said intervening region with a cross-sectional profile having the property that said elastic twisting leaves substantially unchanged the coupling coefficient at each of said first and second wavelengths of one of the principal SOP's of the coupler.

The invention further provides a wavelength multiplexing 2×2 tapered fused fibre coupler in which polarisation sensitivity has been nulled-out by elastic twisting of the coupler, characterised in that said elastic twisting is unaccompanied by any significant change in the coupling strength for one of the principle planes of polarisation of the untwisted coupler.

BRIEF DESCRIPTION OF THE DRAWINGS

There follows a description of a method, embodying the present invention in a preferred form, of making a polarisation insensitive 2×2 tapered fused fibre wavelength multiplexing coupler for use in an optically pumped erbium doped fibre amplifier for multiplexing pump light at a wavelength of about 1470 nm with signal light at a wavelength of about 1550 nm. For purposes of comparison there is also described the manufacture, by methods not embodying the present invention, of two further polarisation insensitive 2×2 tapered fused fibre wavelength multiplexing couplers. The description refers to the accompanying drawings in which.

DETAILED DESCRIPTION OF PREFERRED EMBODIMENTS

Figure 1:
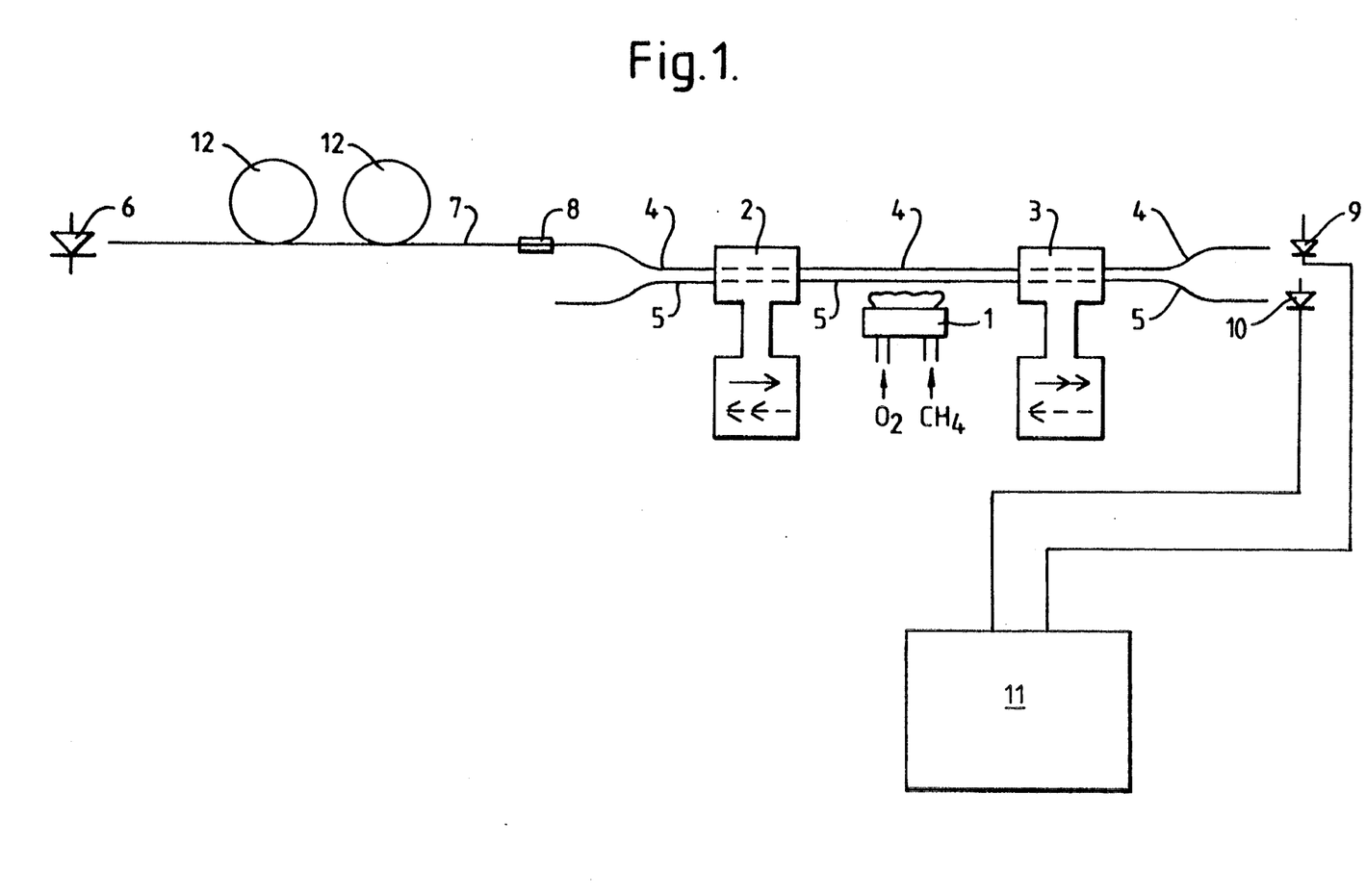
FIG. 1 is a schematic diagram of the appartus employed to make the couplers.
Figure 6:
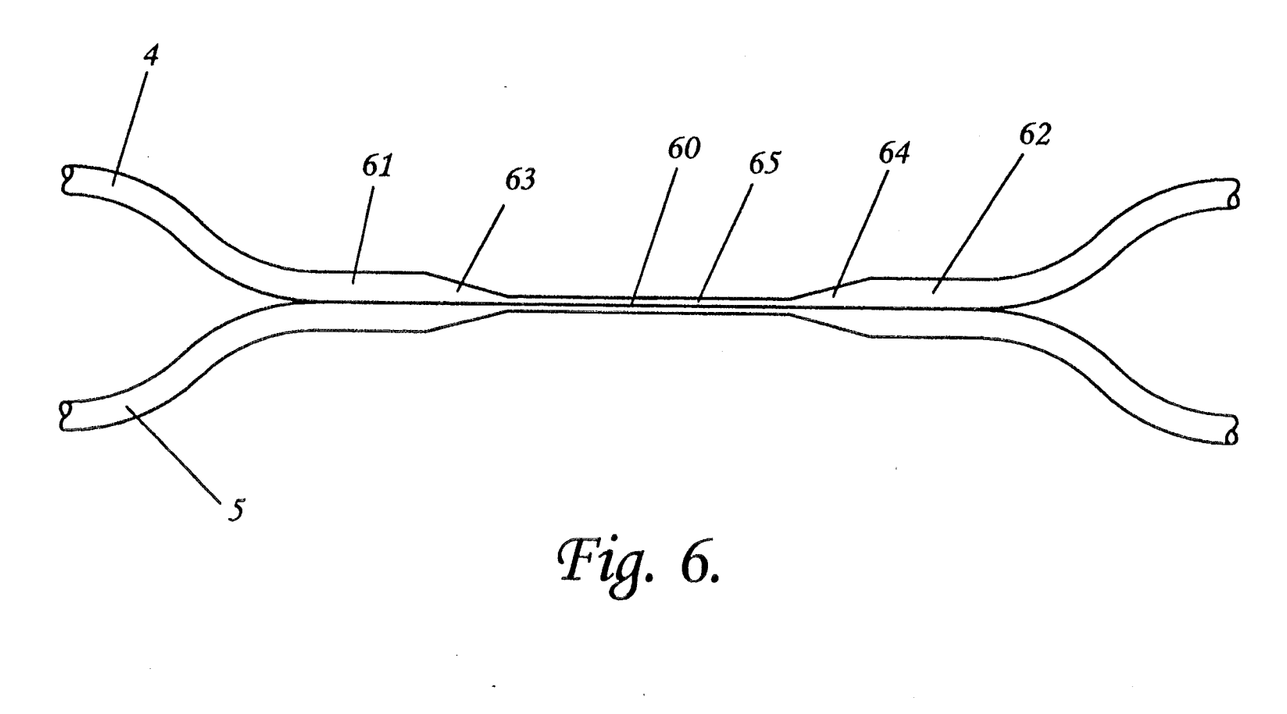
FIG. 6 is a schematic diagram of a 2×2 coupler made with the apparatus of FIG. 1.

Referring to FIG. 1, a burner 1 fuelled with oxygen and methane, and providing a flame approximately 5 mm wide, is located between two motor-driven fibre mounting blocks 2 and 3 arranged for linear movement along a common horizontal axis. The burner 1 is also mounted on a motor-driven carriage (not shown) arranged for linear movement in a horizontal direction at right angles to the common direction of movement of the mounting blocks 2 and 3. First and second lengths 4 and 5 of single mode fibre from which a 2×2coupler is to be made are mounted side-by-side between the mounting blocks 2 and 3. Contact between the fibres between the mounting blocks is required, and can for instance be ensured by a stranding of the two fibres. It may be preferred for such stranding to be performed without twisting either fibre about its own axis. Progressive stretching is performed by arranging to move the two fibre mounting blocks in the same direction, but with the leading block travelling a controlled amount faster than the trailing block, while the fibres are in a heat-softened state produced by the action of the burner. The stretching produces a reduction in cross-sectional area of the two fibres 4 and 5 over the region along which they have been stretched. At each end of the stretched region there is a short tapered region where the cross-sectional area expands to the size of the unstretched regions of the fibres. With progressive stretching it is generally preferred to arrange matters so that the next stretching operation is performed over all but the extreme ends of the region stretched by the preceding stretching operation. Accordingly the tapered regions produced by this stretching operation lie just inboard of the tapers produced by the preceding stretching operation, and so each individual taper follows on reasonably smoothly from its predecessor. In this way the progressive stretching operations are employed to create a profile as schematically depicted in FIG. 6. In this figure, for illustrative convenience, the stranding together of the two fibres 4 and 5 has not been illustrated, but the figure does show that there is a region 60 over which the two fibres are in side-by-side contact; that at the two ends of this in-contact region the figures are of full cross-sectioned size, and hence remain optically uncoupled; that between these two full-size end regions 61 and 62 there are two substantially uniformly tapered regions 63 and 64 linking the full-size regions 61 and 62 with a coupling region 65 of substantially constant cross-sectional are where the cross-sectional area of the fibres has been reduced sufficiently to produce optical coupling between the fibres in this region. Reverting attention to FIG. 1, progress in the construction of the coupler is monitored by directing polarised monochromatic light from a laser 6 into one end of fibre 4 via a single mode fibre link 7 and a temporary splice 8, and then monitoring, with the aid of a pair of photodiodes 9 and 10, the light output from the far ends of fibres 4 and 5. The outputs of the two photodiodes are fed to a chart-recorder 11. Included in the fibre link 7 are two loops 12 that can be independently articulated so as to allow the state of polarisation (SOP) of the light launched into fibre 4 to be explored over the surface of the Poincaré sphere.

At the commencement of the manufacture of a 2×2 coupler by progressive stretching, there is no lateral coupling between the fibres, and hence all the light from laser 6 launched into fibre 4 is transmitted through to detector 9, while none reaches detector 10, As stretching proceeds, there comes a time when coupling begins to become significant, and gradually more and more power is transferred to emerge from fibre 5. At a certain stage the first 3 dB point is reached at which half the initially launched power has been transferred to fibre 5 leaving the remainder to emerge from fibre 4. As stretching proceeds beyond the first 3 dB point, progressively more power is transferred to fibre 5 until the condition is reached at which all the power is transferred to emerge from fibre 5. Then, with continued stretching, power is progressively transferred back so that once again some power emerges from fibre 4. The first cycle is complete when this transfer back is substantially complete, providing the condition that once again substantially all the launched optical power emerges from the far end of fibre 4. Thereafter, further progressive stretching repeats the process to produce a second cycle, then a third cycle, and so on.

In this particular example quoted the two fibres were 125 μm o.d. single mode transmission type fibres, but substantially the same effects have also been replicated using dispersion shifted single mode fibres.

The amount of stretching required to produce a complete cycle is wavelength dependent, and so when the progressive stretching has proceeded to the point at which there have been an integral number, n, of half cycles for one particular wavelength, $\lambda_1$ there will be some other wavelength $\lambda_2$ for which the number of half cycles is (n+1). At this stage therefore the coupler will function as a wavelength multiplexer with maximum and minimum power transfer wavelengths respectively of $\lambda_1$ and $\lambda_2$ or of $\lambda_2$ and $\lambda_1$ according to whether the integer n is odd or even. The difference $(\lambda_2-\lambda_1)$ between these two wavelengths diminishes as the value of n is increased. By way of example, under the particular conditions employed in the manufacture of the three particular couplers to be described below with reference to the drawings, by the time the value of n has reached about 15, the wavelength difference $(\lambda_2-\lambda_1)$ is about 100 nm, and is diminishing at the rate of about 5 nm per unit increase in the value of n.

Figure 2:
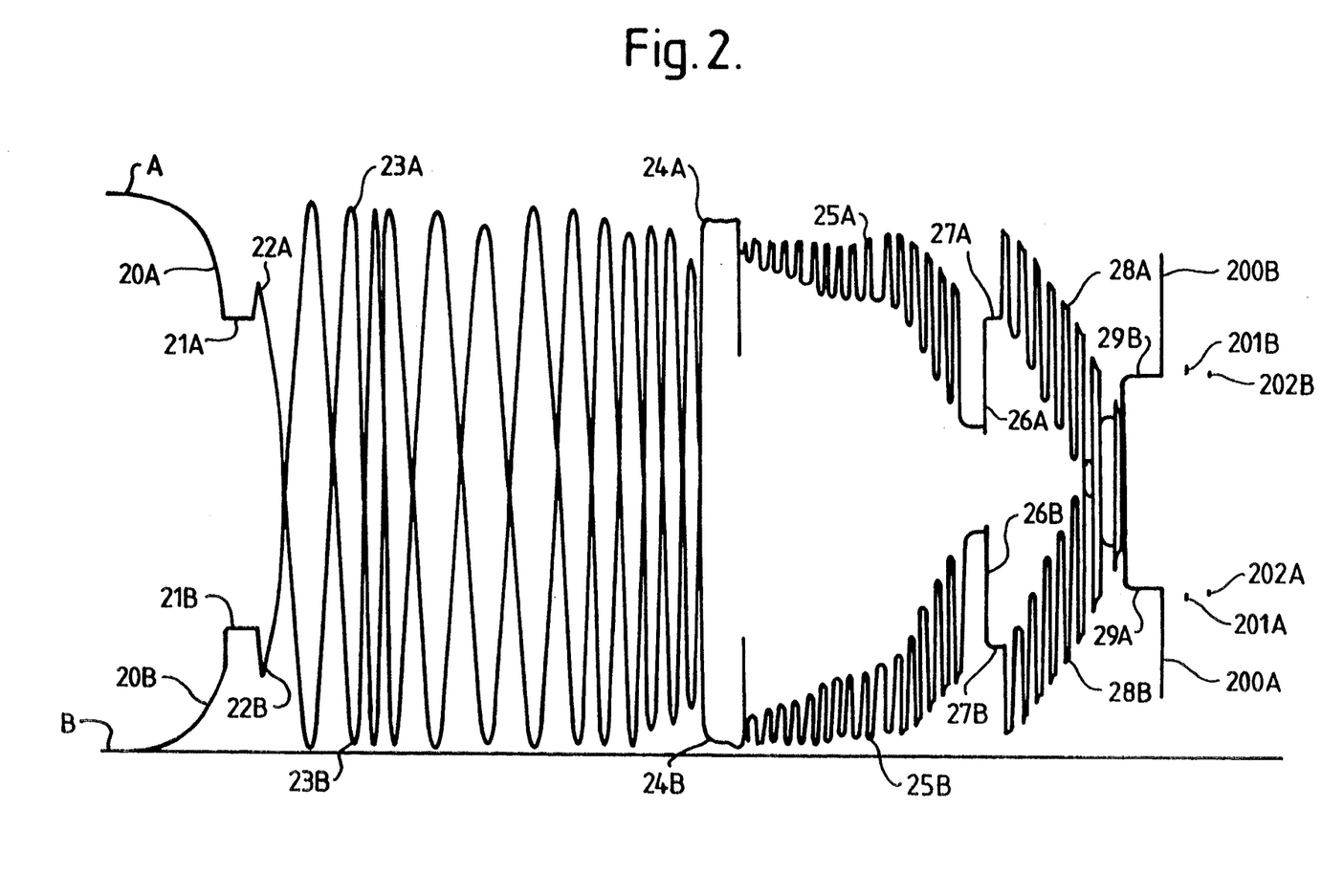
FIG. 2 depicts chart-recorder traces obtained in the course of the manufacture of the first-mentioned 2×2 coupler.

Turning attention now to the specifics involved in the manufacture of the coupler whose monitor chart-recording is represented in FIG. 2, and that is designed for multiplexing light of a specific signal wavelength with that of a specific pump wavelength, it would in principle have been possible to monitor the progress of the stretching using a laser source 6 emitting at either the pump or the signal wavelength. This would mean that one of the outputs of the two fibres 4 and 5 would be at a maximum at the desired end-point of the stretching process while the output of the other would be at a minimum. These maxima and minima are difficult to determine with precision, and hence it is preferred to employ light on intermediate wavelength for monitoring purposes, one for which the distribution of power between the two fibres is changing rapidly at the desired end-point.

It was found convenient to carry out the progressive stretching operation involved in the making of the coupler in three phases. In the first phase several continuous traverses were performed substantially without interruption to bring about the condition in which the coupling between the fibres was increased from zero to about the first 3 dB point. It was during this stage that the bulk of the tapering was effected, and the traverses and extensions of this stage were arranged to ensure that these tapers were substantially adiabatic to light propagating in the fibres. The second phase similarly involved several continuous traverses performed substantially without interruption, the purpose of these traverses being to increase the coupling to a point about half a cycle short of the desired end-point. This second phase was performed with a lower burner temperature than the first phase so that the cross sectional profile in the coupling region extending between the two tapers is determined principally by the temperature of the burner during the first phase. The third phase of the progressive stretching operation was performed in a series of short duration bursts. The interval between consecutive bursts was long enough for the fibres to cool substantially to room temperature so that monitoring could be performed in respect of the coupling existing at room temperature. The sequence of bursts was terminated when the desired end-point, as assessed by the monitoring, was reached. All three phases employed a laser emitting at 1527 nm for monitoring purposes.

FIG. 2 depicts the two traces of a single chart-recording whose time scale is not constant since the recorder was run at different speeds at different times and at times was halted while adjustment were made. Traces A and B respectively record the outputs of photodiodes 9 and 10, and hence at the beginning of the first phase of progressive stretching, while there was still no coupling between the fibres 4 and 5, trace A was at a maximum value while trace B was at zero. At the onset of significance evanescent coupling between the two fibres, trace A began to diminish in value at 20A, while there was a corresponding rise in the value of trace B at 20B. At this juncture there was a pause in the progressive stretching while the burner was removed from under the fibres, and its mass flow control settings and the mounting block traverse rate were charged preparatory for the second phase of progressive stretching. During this time the fibres rapidly cooled to near room temperature. This cooling produced an increase in the coupling strength, which shows up as the steps 21A and 21B in the two traces. Repositioning of the burner under the fibres at the commencement of the second phase quickly raised the temperature again, as evidenced by the spikes 22A and 22B. After this, the stretching, and hence the coupling, steadily increased, with the completion of the first coupling cycle being reached at 23A and 23B. Further stretching then served to complete, in succession, the second and succeeding coupling cycles up to the seventh, completed at 24A and 24B.

At this stage the progressive stretching by the substantially continuous traverses of the first and second phases was halted, to be replaced by the progressive stretching of the third phase performed in short bursts each of less than a second duration. For each burst, the burner 1 is driven by its motor in under the fibres to heat-soften them, and then almost immediately is withdrawn again to allow the fibres to cool. While the fibres are in their heat softened state the mounting block motors are energised to produce momentary traversal and stretching, which is halted again as the burner is withdrawn from under the fibres.

The heating and stretching bursts of the third phase were performed in two batches, a polarisation adjustment being carried out between the end of the first batch and the beginning of the second. The first batch comprised sixteen bursts, each burst producing an associated peak 25A and peak 25B representative of the coupling strength that pertained while the fibres were still in the heat of the burner's flame. Between consecutive bursts the fibres quickly cooled substantially to room temperature, the consequent change in coupling strength resulting from such cooling being revealed by the troughs between adjacent spikes 25A and between adjacent spikes 25B.

At this stage the birefringence of the coupling region produced by the progressive stretching has become significant, and so the state of polarisation (SOP) of the light launched into the coupling region via fibre 4 is aligned with one of the principal polarisation planes of that coupling region. It could have been aligned with the principal polarisation plane with the greater coupling strength, but in fact in this instance it was the other principal polarisation plane that was selected. The two principal polarisation planes were found by articulating the polarisation state adjustment loops 12 to explore the surface of the Poincaré sphere and to determine the alignments that provide the maximum coupling strength and those that provide the minimum coupling strength. This exploration shows up as the vertical lines 26A and 26B. These traces show that, before this exploration was made, the SOP of the light launched into the coupling region happened by chance to be relatively close to the principal polarisation plane having the greater coupling strength. Selection of the principal polarisation plane with the lesser coupling strength shows up as the ledges 27A and 27B.

Thereafter, just eight further bursts 28A and 28B were all that was required to reach the desired endpoint. After the last of these final eight bursts, the coupling strength of the cooled coupling region was represented by the ledges 29A and 29B.

The birefringence of the coupler after completion of the progressive stretching is shown up by the vertical lines 200A and 200B which demonstrate how the coupling strengths changed as the result of articulating the loops 12 to sweep the SOP of the monitor light launched into fibre 4 through the orthogonal polarisation state and back again.

To reduce this birefringence, the coupling region was elastically twisted by rotating a portion of fibre mounting block 2 about the axial direction through 180°. The polarisation exploration was repeated, thereby producing the vertical lines 201A and 201B. Then the coupling region was elastically twisted through a further 10° before repeating the polarisation exploration a further time and thereby producing the vertical lines 202A and 202B. The shortness of the lines 201A, 201B, 202A and 202B in comparison with lines 200A and 200B demonstrate that an elastic twist of between 180° and 190° has been effective substantially to eliminate the birefringence exhibited by the coupler.

Particularly to be noted is the fact that the minimum coupling strength of the coupler before it has been elastically twisted, as represented by the level of the upper end of line 200A and that of the lower end of line 200B, is substantially the same as the minimum coupling strength of the coupler after it has been elastically twisted through 180° to 190°, of lines 201A and 202A and by the level of the lower ends of lines 201B and 202B. Thus it is demonstrated that in this instance the elastic twisting has produced no significant shift in the minimum and maximum power transfer wavelengths for light propagating through the coupling region polarised in the principal polarisation plane affording, before the twisting, the lesser coupling strength. The spectral plot of the completed coupler for both of its principal polarisation planes is depicted in FIG. 3.

Figure 3:
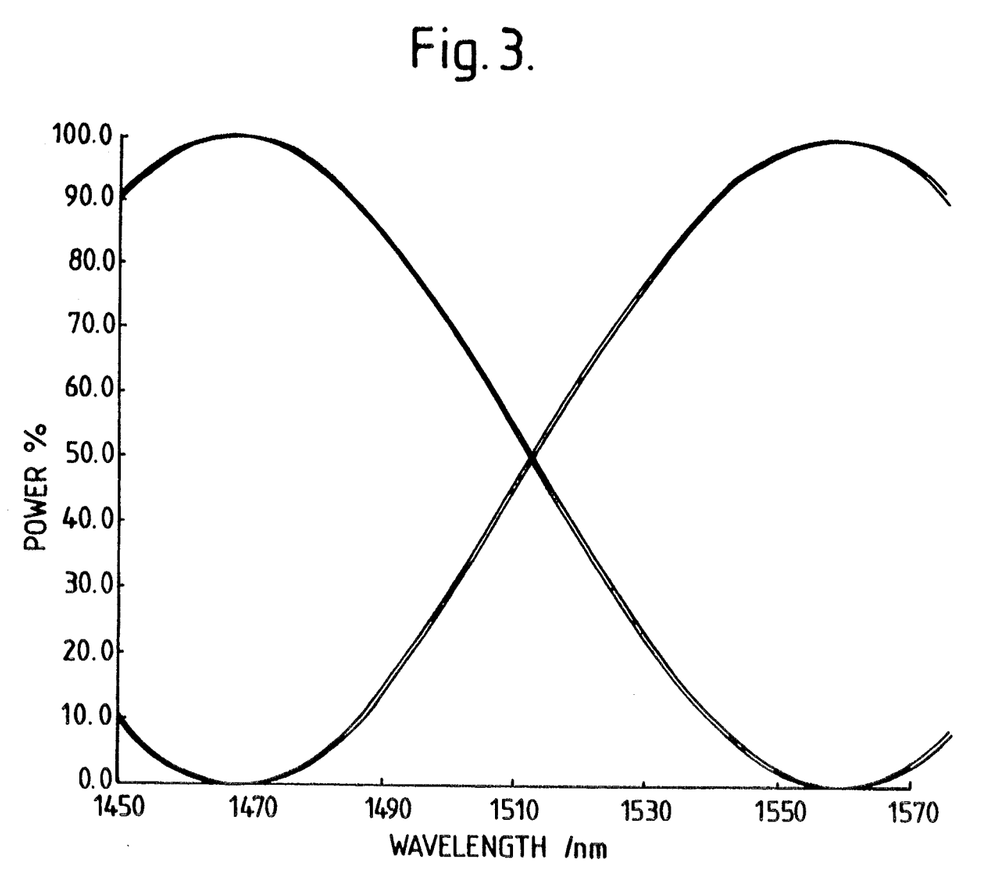
FIG. 3 depicts a spectral plot of the transmission characteristics of the resulting coupler for each of its two priciple planes of polarisation.
Figure 4:
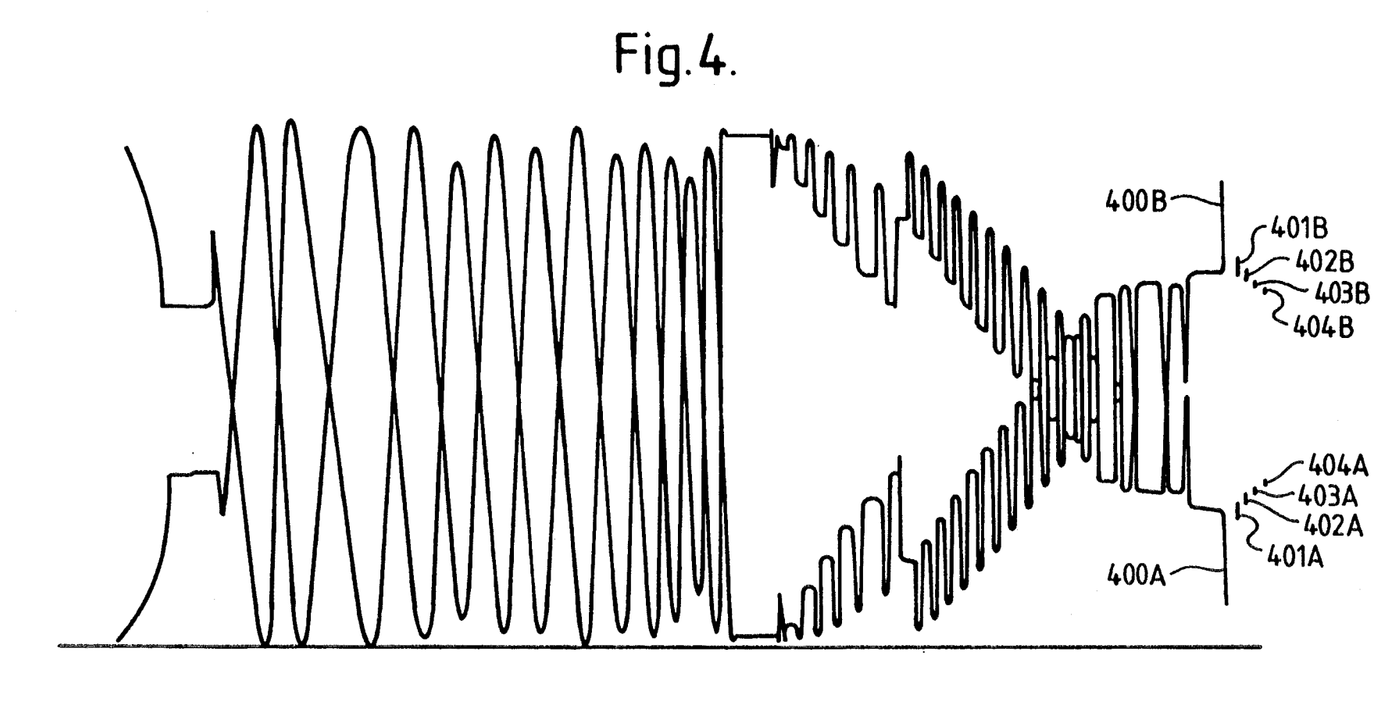
FIGS. 4 and 5 depict chart-recorder traces respectively obtained in the course of the manufacture of the above mentioned two further couplers.
Figure 5:
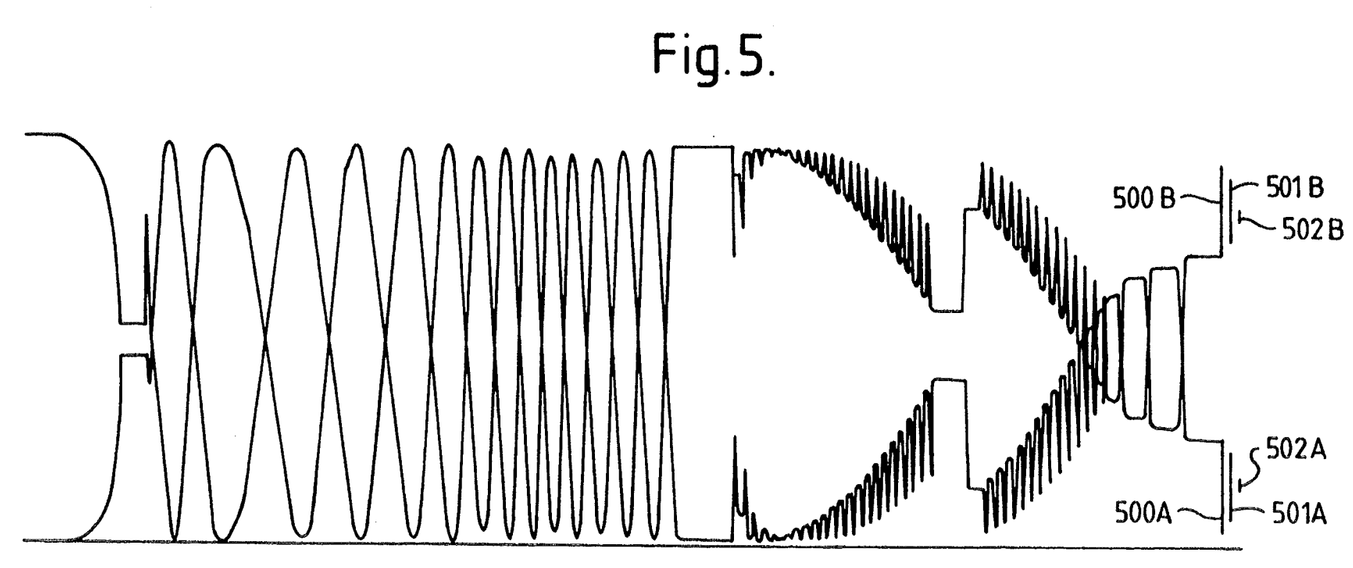

For purposes of comparison with the coupler of FIG. 2 and 3, a portion of a chart-recording is represented in FIG. 4 that is similar to that of FIG. 2, but is in respect of a coupler made in substantially the same general way as that of FIGS. 2 and 3, except for the significant difference that a slightly hotter flame was employed in the first phase of the progressive stretching. FIG. 5 is similar, except for the fact that in this instance a slightly cooler flame was employed in the first phase. The hotter and cooler flames were obtained by changing the mass flow controller settings for the oxygen and methane supplies to the burner 1 from the original settings employed in the manufacture of the coupler of FIGS. 2 and 3. For the hotter flame the settings were increased by 4%, while for the cooler flame they were decreased by the same amount.

A review of FIGS. 4 and 5 reveals that the second and third phases proceeded in a manner substantially the same as in the manufacture of the coupler of FIGS. 2 and 3. The original mass flow settings employed in the first phase in the construction of the coupler of FIGS. 2 and 3 were such as to produce a relatively high temperature stretching regime, as represented by the fact that the resulting coupling region exhibited an aspect ratio of approximately 1.2 to 1.

In the case of the coupler of FIG. 4, its birefringence prior to elastic twisting is revealed by vertical lines 400A and 400B produced by polarisation exploration. Polarisation exploration after the coupler had been elastically twisted through 170°, 180°, 190° and 200° similarly produced the vertical lines 401A & B, 402A & B, 403A & B and 404A & B respectively. From the positioning and length of these lines, it is seen that twisting through about half a turn was sufficient to remove substantially all the birefringence, but that, resulting from the use of the hotter flame in progressive stretching, this removal introduced a significant reduction in coupling strength for the less strongly coupled principal polarisation plane.

Similarly, in the case of the coupler of FIG. 5, its birefringence prior to elastic twisting is revealed by vertical lines 500A and 500B produced by polarisation exploration. Polarisation exploration after the coupler had been elastically twisted through 90° and 180° similarly produced the vertical lines 501A & B and 502A & B respectively. From the positioning and length of these lines, it is seen that twisting through about half a turn was sufficient to remove substantially all the birefringence, but that, resulting from the use of the cooler flame in progressive stretching, this removal introduced a significant increase in coupling strength for the less strongly coupled principal polarisation plane.

We claim:

1. A method of manufacturing a wavelength multiplexing 2×2 tapered fused fibre coupler by progressive stretching, wherein birefringence in the coupler resulting from coupling produced by the progressive stretching to produce a coupling region is substantially nulled-out by elastic twisting of the progressively stretched coupling region, and wherein the progressive stretching is performed under temperature conditions providing the coupling region with a profile having the property that the coupling for one of the principle birefringence planes of polarisation of the coupling region remains substantially constant during said elastic twisting.

2. A method of making a 2×2 tapered fused fibre wavelength multiplexing coupler for multiplexing first and second wavelengths, wherein a pair of single mode optical fibres arranged in side-by-side contact are heated in a zone where they are in contact, fused together and plastically stretched in a manner providing two tapers with an intervening region of reduced, substantially constant, cross-section, along which intervening region the two fibres are mutually optically coupled, wherein the intervening region is elastically twisted substantially to null, at each of said first and second wavelengths, the difference between the coupling coefficients of the two principal states of polarisation (SOP's) defined by the coupler, and wherein the fusion of the two fibres is at a temperature providing said intervening region with a cross-sectional profile having the property that said elastic twisting leaves substantially unchanged the coupling coefficient at each of said first and second wavelengths of one of the principal SOP's of the coupler.

3. A wavelength multiplexing 2×2 tapered fused fibre coupler in which polarisation sensitivity has been nulled-out by elastic twisting of the coupler, characterised in that said elastic twisting is unaccompanied by any significant change in the coupling strength for one of the principle planes of polarisation of the untwisted coupler.

* * * * *